US012656621B2

(12) United States Patent
Huang et al.

(10) Patent No.: US 12,656,621 B2
(45) Date of Patent: Jun. 16, 2026

(54) RECTANGULAR CUBOID, NON-POLARIZING BEAM SPLITTER THAT AVOIDS INTERFERENCE FRINGES FROM SURFACE REFLECTIONS

(71) Applicant: KLA Corporation, Milpitas, CA (US)

(72) Inventors: Haifeng Huang, Livermore, CA (US); Mitchell Lindsay, Livermore, CA (US); Eric Vella, Mountain View, CA (US); Thomas Redding, Tracy, CA (US)

(73) Assignee: KLA Corporation, Milpitas, CA (US)

( * ) Notice: Subject to any disclaimer, the term of this patent is extended or adjusted under 35 U.S.C. 154(b) by 260 days.

(21) Appl. No.: 18/372,663

(22) Filed: Sep. 25, 2023

(65) Prior Publication Data

US 2024/0280828 A1     Aug. 22, 2024

Related U.S. Application Data

(60) Provisional application No. 63/447,058, filed on Feb. 21, 2023.

(51) Int. Cl.
  *G02B 27/14*      (2006.01)
  *G01N 21/88*      (2006.01)
  *G01N 21/95*      (2006.01)

(52) U.S. Cl.
  CPC ....... *G02B 27/144* (2013.01); *G01N 21/8806* (2013.01); *G01N 21/9501* (2013.01)

(58) Field of Classification Search
  CPC .......................... G02B 27/144; G01N 21/8806
  See application file for complete search history.

(56) References Cited

U.S. PATENT DOCUMENTS

| | | | |
|---|---|---|---|
| 2002/0001087 A1* | 1/2002 | Hill ................... | G01B 9/02003 |
| | | | 356/510 |
| 2003/0086158 A1 | 5/2003 | McClay et al. | |
| 2007/0086018 A1 | 4/2007 | Shih et al. | |
| 2017/0003649 A1* | 1/2017 | Sinha .................. | G03H 1/0443 |
| 2022/0397860 A1* | 12/2022 | Hong .................. | G03H 1/0443 |

FOREIGN PATENT DOCUMENTS

| | | |
|---|---|---|
| CN | 101750751 A | 6/2010 |
| EP | 2711762 A1 | 3/2014 |

OTHER PUBLICATIONS

WIPO, International Search Report for PCT/US2024/015082, May 27, 2024.

* cited by examiner

*Primary Examiner* — James A Dudek
(74) *Attorney, Agent, or Firm* — Hodgson Russ LLP

(57)     ABSTRACT

A non-polarizing beam splitter can be a rectangular cuboid. A diagonal surface in the beam splitter extends from a corner between the first surface and the second surface at a 45° angle to a point on the third surface or the fourth surface. A beam of light is split into a transmitted beam and a reflected beam using the non-polarizing beam splitter.

14 Claims, 7 Drawing Sheets

200

RECTANGULAR CUBOID, NON-POLARIZING BEAM SPLITTER THAT AVOIDS INTERFERENCE FRINGES FROM SURFACE REFLECTIONS

CROSS-REFERENCE TO RELATED APPLICATIONS

This application claims priority to the provisional patent application filed Feb. 21, 2023 and assigned U.S. App. No. 63/447,058, the disclosure of which is hereby incorporated by reference.

FIELD OF THE DISCLOSURE

This disclosure relates to optical systems and, more particularly, to beam splitters.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on masks and wafers or other workpieces to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

Defect review typically involves re-detecting defects that were detected by an inspection process and generating additional information about the defects at a higher resolution using either a high magnification optical system or a scanning electron microscope (SEM). Defect review is typically performed at discrete locations on specimens where defects have been detected by inspection. The higher resolution data for the defects generated by defect review is more suitable for determining attributes of the defects such as profile, roughness, or more accurate size information.

Metrology processes are also used at various steps during semiconductor manufacturing to monitor and control the process. Metrology processes are different than inspection processes in that, unlike inspection processes in which defects are detected on wafers or other workpieces, metrology processes are used to measure one or more characteristics of the workpieces that cannot be determined using existing inspection tools. Metrology processes can be used to measure one or more characteristics of workpieces such that the performance of a process can be determined from the one or more characteristics. For example, metrology processes can measure a dimension (e.g., line width, thickness, etc.) of features formed on the workpieces during the process. In addition, if the one or more characteristics of the workpieces are unacceptable (e.g., out of a predetermined range for the characteristic(s)), the measurements of the one or more characteristics of the workpieces may be used to alter one or more parameters of the process such that additional workpieces manufactured by the process have acceptable characteristic(s).

Imaging systems used for inspection or metrology can use a beam splitter as part of the optics. A beam splitter is an optical device that splits a beam of light into a transmitted and a reflected beam. When the beam splitter is a cube, the beam splitter is made from two triangular glass prisms that are glued together at their base, such as using polyester, epoxy, or urethane-based adhesives. The thickness of the resin layer is adjusted such that (for a certain wavelength) half of the light incident through one surface of the cube is reflected and the other half is transmitted. A cube beam splitter can have a special coating between the two triangular glass prisms to realize the designed splitting efficiency between the reflected and transmitted beams and the two triangular prisms are put together by optical contact only (i.e., no optical adhesive is needed). Polarizing beam splitters, such as the Wollaston prism, use birefringent materials to split light into two beams of orthogonal polarization states.

A cubic beam-splitter (BS) can be used in an imaging system to couple in and direct an illumination light beam to a sample and pass the returned signal light beam to an image sensor, as shown in FIG. 1. Such a beam-splitter can be polarizing (PBS) or non-polarizing (NPBS), depending on its design. If the diagonal surface S1 in FIG. 1 has near unit reflectivity and transmission for incident s-polarization light and p-polarization light, respectively ($R_s \approx 1$ and $T_p \approx 1$) then the cubic beam splitter is polarizing. This implies near zero transmission and reflectivity for s-polarization and p-polarization respectively on S1, i.e., $T_s \approx 0$ and $R_p \approx 0$. For this situation, the p-polarization component in the returned signal beam in FIG. 1 will pass the beam splitter and reach the image sensor. Between the beam splitter and sample, there are imaging optics (e.g., lenses) and polarization control optics (e.g., waveplates). If the diagonal surface S1 has partial reflectivity and transmission for s-polarization and p-polarization respectively (e.g., $R_s/T_s \sim 50/50$ and $R_p/T_p \sim 50/50$) by specially designed coating stacks on S1, then the cubic beam splitter is non-polarizing. In such a case, both s-polarization and p-polarization components in the returned signal beam in FIG. 1 can reach the image sensor.

For a standard cubic non-polarizing beam-splitter used in an imaging system, two reflection beams from its two surfaces have near zero optical path difference (OPD) between them, and the OPD can be much less than the time coherence length of illumination light. When the two reflection surfaces have small angle deviations from their ideal orientations, the two reflected beams will form a small angle and produce interference fringes on the image sensor of the imaging system. The interference fringe can be a bright or dark band caused by light beams that are in phase or out of phase with each other. The interference fringes can reduce image quality substantially. Reducing or removing the interference fringes by reducing the small tilt angle (e.g., a few arcsec) deviations of the two reflection surfaces of a beam splitter is challenging because such a small angle tolerance is either close to the limit of manufacturing capability or will make the cost of such cubic beam-splitters too high.

In FIG. 1, two reflection beams from two surfaces S2 and S5 are also shown. The reflectivity of S2 and S5 antireflective (AR) coatings is $R_2$ and $R_5$ respectively. For the s-polarization component in the illumination beam, the portion of light power from two reflections and reaching the image sensor is proportional to the following.

$$R_s R_5 T_s + T_s R_2 R_s$$

For the p-polarization component in the illumination, the portion of light power from two reflections and reaching the image sensor is proportional to the following.

$$R_p R_5 T_p + T_p R_2 R_p$$

Antireflective coating residual reflectivities $R_2$ and $R_s$ are typically small. For a polarizing beam splitter, $T_s \approx 0$ and $R_p \approx 0$. However, for a non-polarizing beam splitter, each of the above four terms will be much larger than that of polarizing beam splitter because none of $R_s$, $T_s$, $R_p$, $T_p$ of surface S1 is near zero.

Thus, for polarizing beam splitter situation, only a tiny portion of light reflections from S2 and S5 reaches the image sensor, but for non-polarizing beam splitter case, unless the reflectivity of S2 and S5 anti-reflective coatings is close to zero, the portion of light power from the two surface reflections and reaching the image sensor gets larger and can cause imaging problems.

FIG. 2 is one such example when using a cubic non-polarizing beam splitter. The image contains interference fringes, shown by the intensity slice plot. The image in FIG. 2 was captured in an inspection system when a cubic NPBS was used. The interference fringes are caused by the two reflection beams from cube surface S2 and S5. There are three beams reaching the image sensor, as shown in FIG. 1: the signal beam and two reflection beams from S2 and S5. These are shown with the solid line, dashed line, and dotted-dashed line, respectively. Assuming there is no interference between the signal and the two reflection beams because of the large OPD between the signal and the two reflection beams, and only the two reflections interfere with each other, the fringe contrast can be calculated by the following equation.

$$\text{Fringe Contrast} = 2\sqrt{R_2 R_5} / (R_2 + R_5 + \text{Signal})$$

For a signal level of 3%, if $R_2 = 0.2\%$ and $R_5 = 0.2\%$ (i.e., high quality antireflective coatings), the calculated fringe contrast is 11.8%.

FIG. 3 illustrates the cause of the observed interference fringes. In FIG. 3, surface S2' is the image of surface S2 with regard to the diagonal surface S1. The reflection from surface S2 is equivalent to that from the virtual surface S2'.

In a common cubic non-polarizing beam splitter, unless S1 and S2; S1 and S5; and S2 and S5 form perfect 45°, 45°, and 90° angles respectively in 3D space, S5 and S2' will not overlap but have a small angle between them (which is exaggerated in FIG. 3 for ease of understanding). Therefore, the two reflected beams in FIG. 3 will not be in parallel and forms a small angle β' between them outside the beam splitter. Inside the beam splitter, the angle is β=β'/n, with n the refractive index of beam splitter material. Using a simple model of two plane wave interference, the spatial period A of interference fringes can be calculated from light wavelength λ and the angle β'.

$$\Lambda = \lambda / \beta'$$

If λ=193 nm and β'=200 μrad or 41.3 arcsec, fringe period A is about 1 mm and agrees well with observed fringes for the order of magnitude of fringe period. To reduce the impact of fringes, one way is to increase its period such that small size image sensor length is less than one fringe. If the period is increased to >10 mm, angle β' cannot be more than several arcsec and the allowed deviations (or tolerances) of S2 and S5 surfaces from their perfect positions are even smaller by a factor of beam splitter material refractive index. Fabricating such a cubic non-polarizing beam splitter with near perfect geometry is challenging and will be very expensive.

Therefore, improved systems and methods are needed.

BRIEF SUMMARY OF THE DISCLOSURE

A beam splitter is provided in a first embodiment. The beam splitter includes a first surface; a second surface connected with and perpendicular to the first surface; a third surface connected with and perpendicular to the first surface and opposite from the second surface; and a fourth surface connected with and perpendicular to the second surface and the third surface. The first surface has a different length than the second surface. The third surface has a same length as the second surface. The fourth surface is opposite of the first surface. A diagonal surface in the beam splitter extends from a corner between the first surface and the second surface at a 45° angle to a point on the third surface or the fourth surface. The beam splitter is non-polarizing.

In an instance, the beam splitter is rectangular cuboid.

The first surface and the fourth surface may have a same surface area. The second surface and the third surface may have a same surface area.

The diagonal surface can intersect the third surface at a point between adjacent corners (or edges) of the third surface.

The diagonal surface can intersect the fourth surface at a point between adjacent corners (or edges) of the fourth surface.

The beam splitter can be configured to have no interference fringes by reflections.

The optical path difference between reflection beams in the beam splitter may be longer than a time coherence length of illumination light.

A method is provided in a second embodiment. The method includes directing a beam of light at a beam splitter. The beam splitter is non-polarizing. The beam splitter includes a first surface; a second surface connected with and perpendicular to the first surface; a third surface connected with and perpendicular to the first surface and opposite from the second surface; and a fourth surface connected with and perpendicular to the second surface and the third surface. The first surface has a different length than the second surface. The third surface has a same length as the second surface. The fourth surface is opposite of the first surface. A diagonal surface in the beam splitter extends from a corner between the first surface and the second surface at a 45° angle to a point on the third surface or the fourth surface. The beam of light is split into a transmitted beam and a reflected beam.

The beam of light can be directed at the first surface.

In an instance, the beam splitter is rectangular cuboid.

The first surface and the fourth surface may have a same surface area. The second surface and the third surface may have a same surface area.

The diagonal surface can intersect the third surface at a point between adjacent corners (or edges) of the third surface.

The diagonal surface can intersect the fourth surface at a point between adjacent corners (or edges) of the fourth surface.

The beam splitter can be configured to have no interference fringes by reflections.

The optical path difference between reflection beams in the beam splitter may be longer than a time coherence length of illumination light.

The method can further include imaging the beam of light with an image sensor.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein include a design of a three-dimensional rectangular, non-polarizing beam-splitter that does not cause interference fringes by the reflections from two of its surfaces. The new design increases the OPD between the two reflection beams to be longer than the time coherence length of illumination light, which avoids interference fringes. Embodiments of the design disclosed herein are more feasible and cheaper to manufacture than other designs that address this problem, such as near-perfect cubic beam splitters with tight manufacturing tolerances. Embodiments disclosed herein avoid the need for a near-perfect antireflective coating or the need to reduce the tiny tilt deviation between the two surfaces even further.

Figure 1:
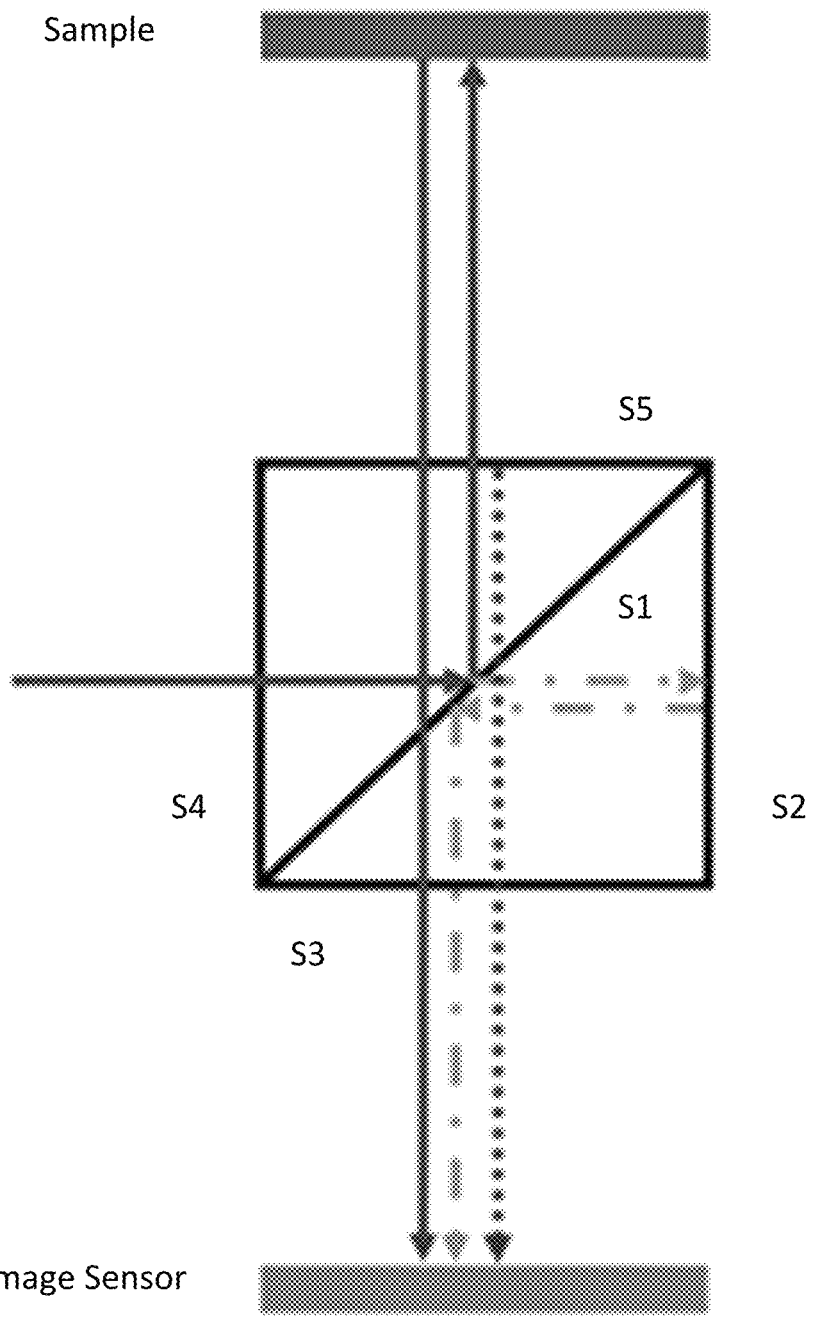
FIG. 1 is an example of a beam-splitter cube with diagonal surface S1 that is used to couple illumination beams (solid lines) and to pass signal beam (solid line) in an imaging system, wherein the dotted line is the reflected beam from its surface S5, and the dot-dash-dot lines correspond to the reflection from its surface S2.
Figure 2:
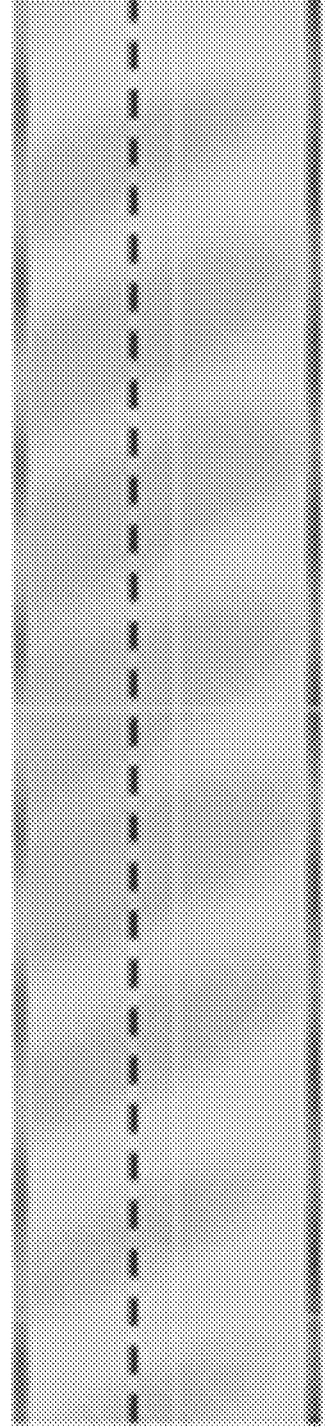
FIG. 2 shows examples of an image with interference fringes (top panel) and the intensity slice (bottom panel) along the dash line in the image from an imaging system using a non-polarizing beam splitter (NPBS).
Figure 2:
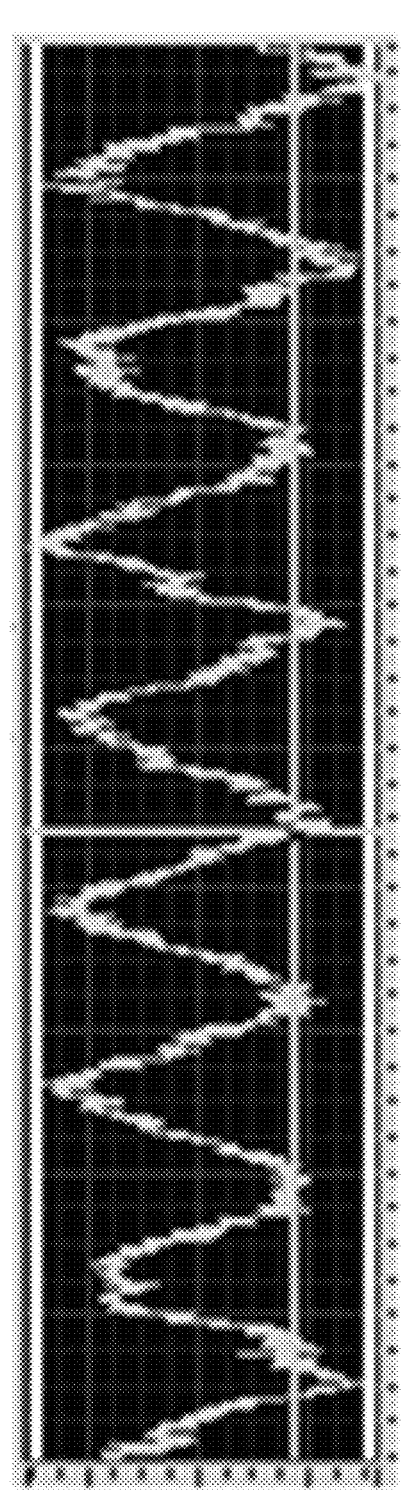
Figure 3:
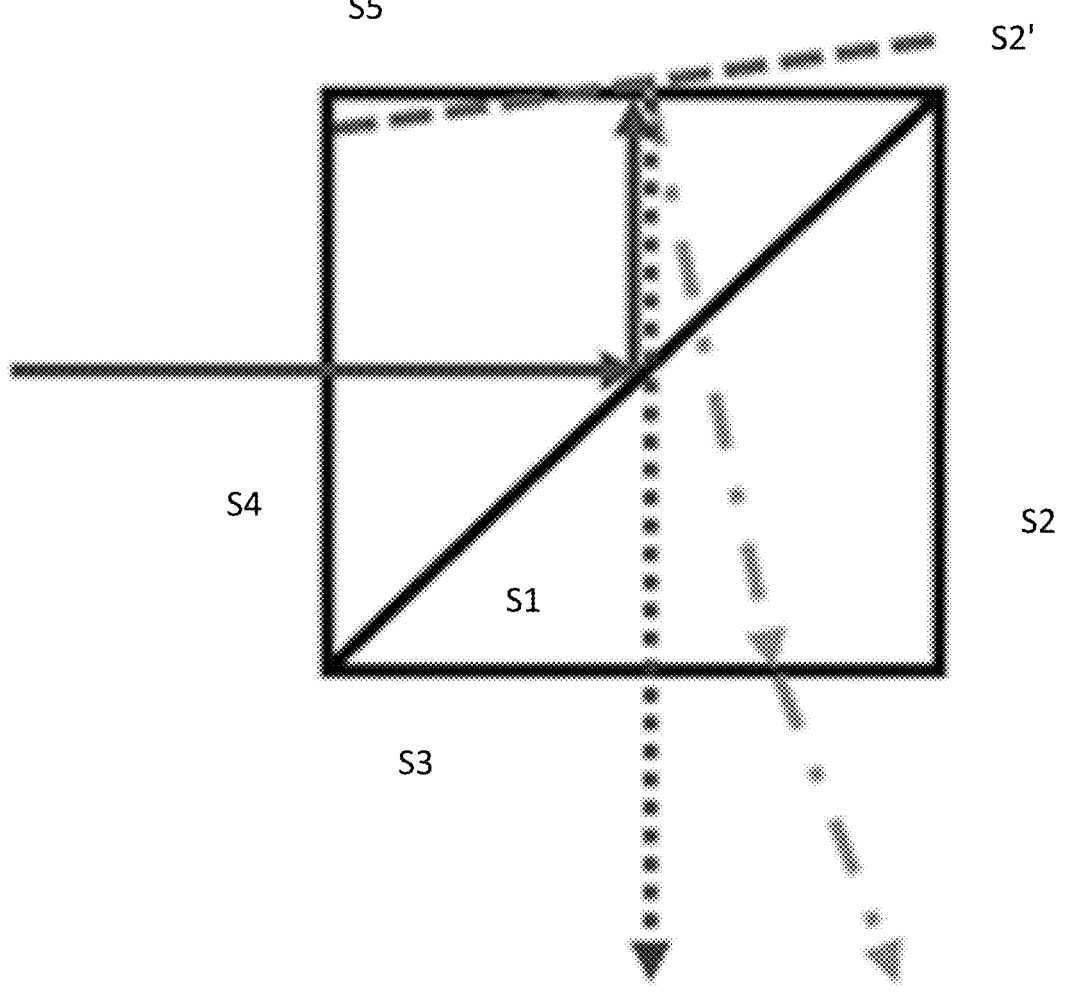
FIG. 3 illustrates the root cause of observed interference fringes. S2' is the image of surface S2 with regard to surface S1. The tilt between S5 and S2' (which is exaggerated) generates a non-zero angle between the two reflected beams (dotted and dot-dash-dot lines), which can cause interference fringes on image sensor.
Figure 4:
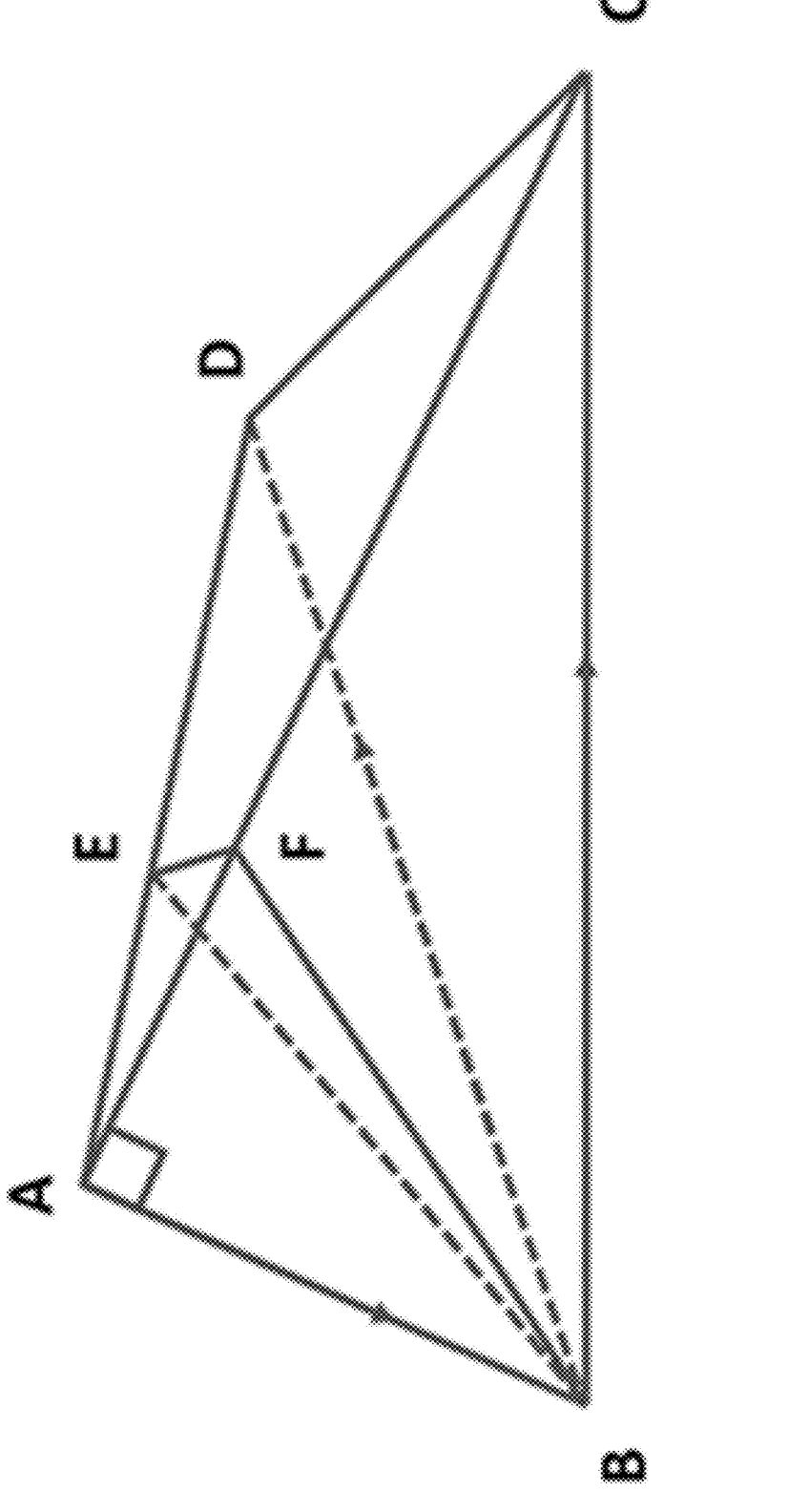
FIG. 4 illustrates the relationship between reflection surface tilt angle and the angle β, inside the beam splitter. A light ray, AB, is reflected by two surfaces S5 and S2' (not illustrated) with their normal directions, BE and BF, to the directions of BD and BC respectively. ∠EBF=α is the tilt between S5 and S2' surfaces. ∠DBC=β is the angle between the two reflections BD and BC. ∠ABE-θ₁ and ∠ABF=θ₂ are two angles of incidence. ∠DAC=γ is the angle formed by the two planes ABD and ABC with AB⊥AC and AB⊥AD.

FIG. 4 explains the relationship between reflection surface tilt angle and the angle β, inside the beam splitter. A light ray, AB, is reflected by two surfaces S5 and S2' (not drawn in FIG. 4 for clarity) with their normal directions, BE and BF, to the directions of BD and BC, respectively. ∠EBF=α is the tilt between S5 and S2' surfaces. ∠DBC=β is the angle between the two reflections BD and BC. ∠ABE=θ₁ and ∠ABF=θ₂ are two angles of incidence with regard to reflection surfaces S5 and S2', respectively. ∠DAC=γ is the angle formed by the two planes ABD and ABC with AB⊥AC and AB ⊥AD. For small tilt angle α, the angle between two reflections β≈2α, independent of angles of incidence (AOI) θ₁ and θ₂. The general equations relating the angles α, β, and γ are as follows.

$$\cos \alpha = \cos(\theta_1 - \theta_2) + \sin \theta_1 \sin \theta_2 (\cos \gamma - 1)$$

$$\cos \beta = \cos(2\theta_1 - 2\theta_2) + \sin 2\theta_1 \sin 2\theta_2 (\cos \gamma - 1)$$

When θ₁ and θ₂ are much larger than α, since α is small, γ also will be near zero. Thus, the second terms on the right side of the two previous equations are negligible compared with the first terms because $\cos \gamma - 1 \approx -\gamma^2/2$. The result is β≈2α. When both θ₁ and θ₂ are also small and comparable with the small angle α, the angle γ may not be small. However, the second terms of the equations can be dropped because the two first terms are close to one, but the two second terms are near zero because sine of θ₁ and θ₂, and of 2θ₁ and 2θ₂ are near zero. In summary, for small tilt angle α between S5 and S2' surfaces, the angle β between the two reflection beams is about two times of α and independent of illumination beam incident angle.

The time coherence length of a laser light source is determined by its wavelength and spectral bandwidth. If λ=193 nm and Δλ=10 μm, the coherence length is calculated to be 3.7 mm. When a non-polarizing beam-splitter is used under such illumination light source, if there exists an extra OPD, which is longer than the laser coherence length, between the two reflections from S2 and S5 surfaces on the image sensor, there will be no interference fringes between them. The two surface reflections only generate simple intensity addition on image sensor.

OPD is the difference between two optical path lengths. As shown herein, it is the OPD between the two surface reflection beams from S2 and S5. Both of them are from the incident beam and can reach the image sensor. The OPD between then is determined by the NPBS and the refractive index of the NPBS at the application wavelength.

Figure 5:
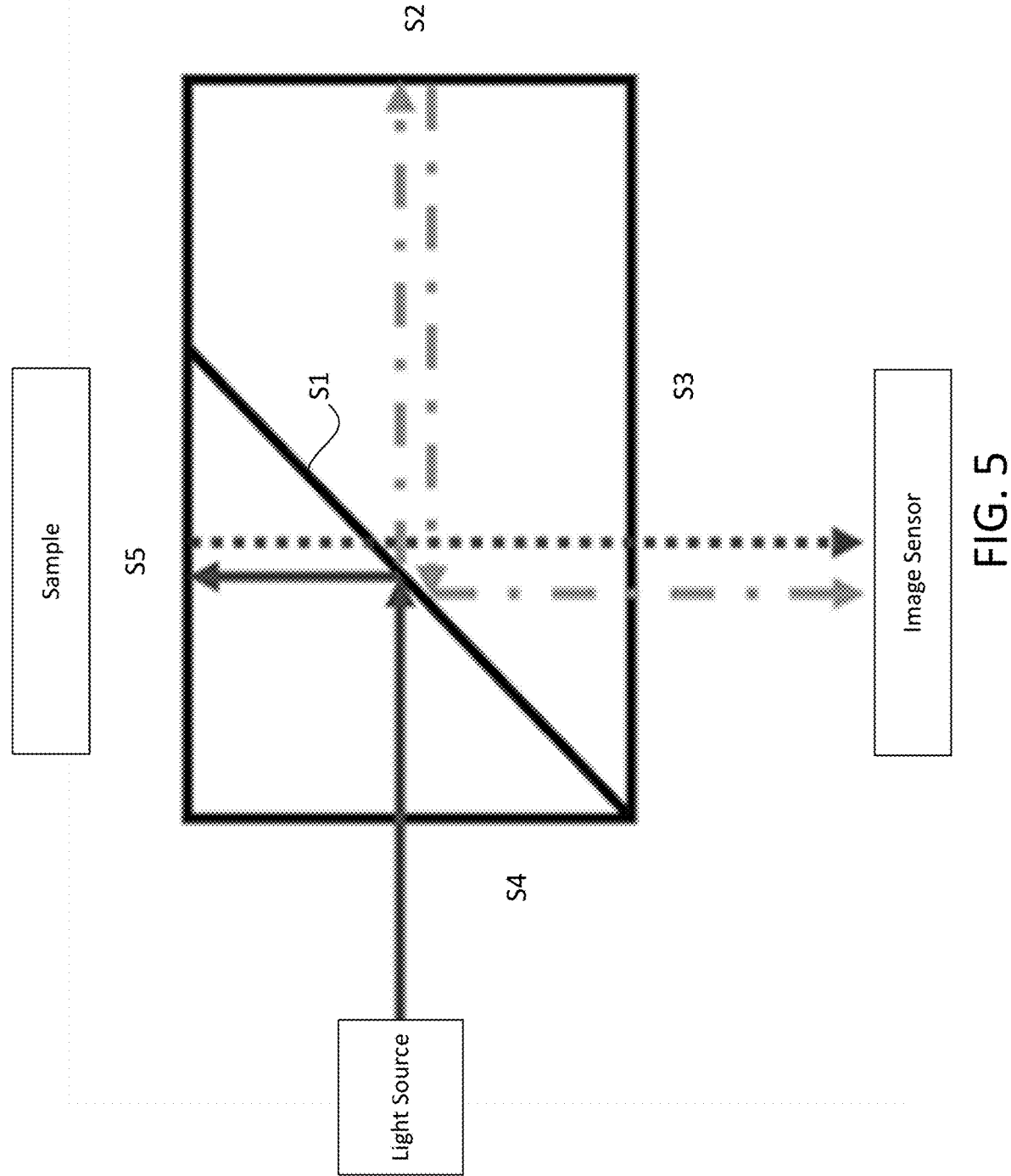
FIG. 5 is an example of a beam splitter in accordance with the present disclosure. A rectangular cuboid beam-splitter with an elongated surface S2 side to increase the optical path difference (OPD) between the two reflections.
Figure 6:
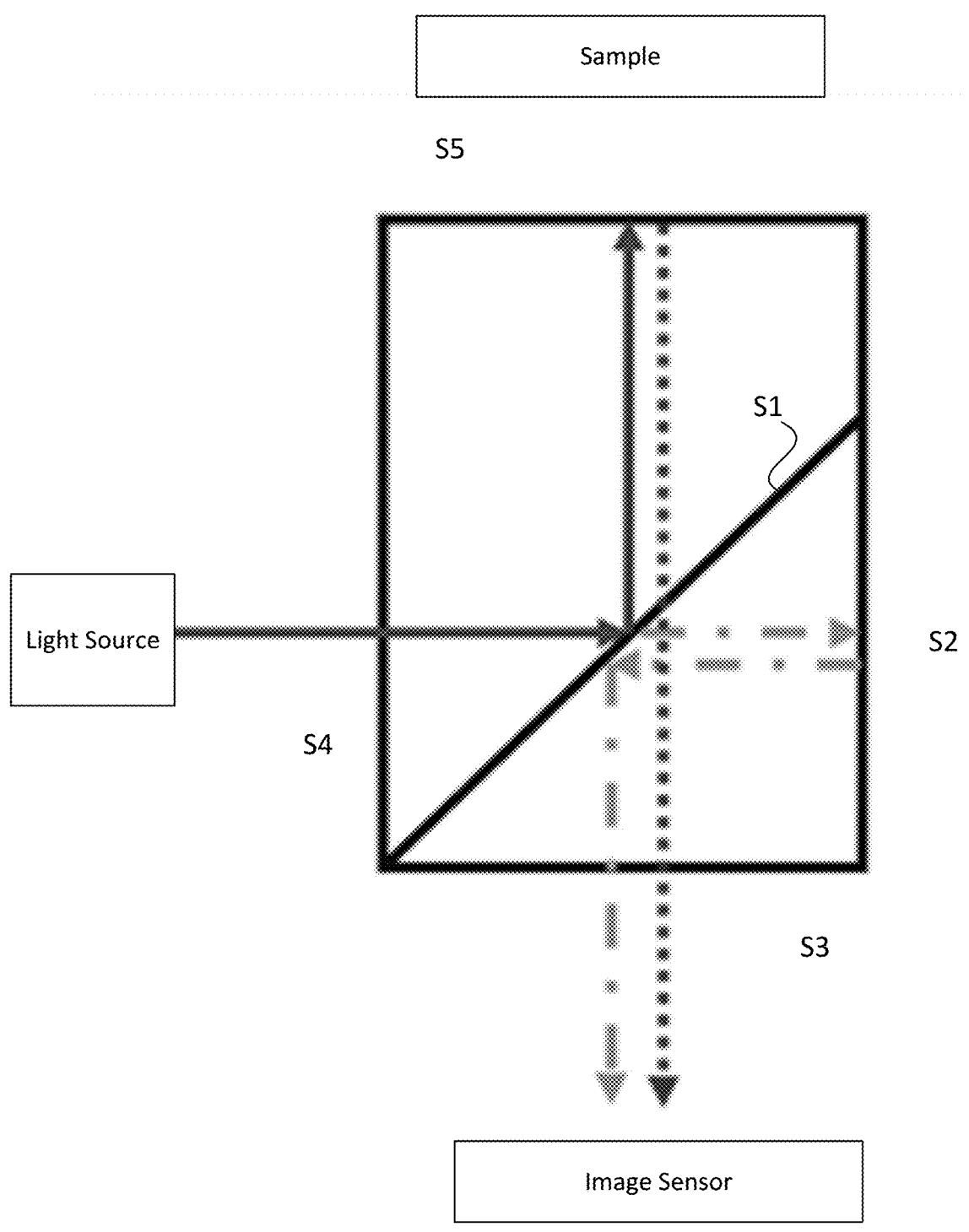
FIG. 6 is another example of a beam splitter in accordance with the present disclosure. A rectangular cuboid beam-splitter with an elongated surface S5 side to increase the OPD between the two reflections.

FIGS. 5 and 6 illustrate embodiments of a beam splitter in accordance with the present disclosure. The beam splitter is a three-dimensional rectangle. In an instance, the beam splitter is non-polarizing. FIGS. 5 and 6 illustrate the light source, image sensor, and sample (e.g., semiconductor mask, wafer, or other workpiece).

As shown in FIG. 5, the beam splitter has a first surface S4 and a second surface S3. The second surface S3 is connected with and perpendicular to the first surface S4. The second surface S3 is longer than the first surface S4. In this instance, connected can mean directly attached with or connected with an additional layer or component in between.

A third surface S5 is connected with and perpendicular to the first surface S4. The third surface S5 is opposite from the second surface S3. The third surface S5 has a same length as the second surface S3.

A fourth surface S2 is connected with and perpendicular to the second surface S3 and the third surface S5. The fourth surface S2 has a same length at the first surface S4.

The first surface S4, second surface S3, third surface S5, and fourth surface S2 can all be external surfaces. Thus, these surfaces can be on the outside of the beam splitter.

In FIG. 5, a diagonal surface S1 in the beam splitter extends from a corner between the first surface S4 and the second surface S3 to a point on the third surface S5 that is a non-zero distance from a corner between the third surface S5 and the first surface S4 and that is a non-zero distance from a corner between the third surface S5 and the fourth surface S2. The diagonal surface S1 extends at a 45° angle relative to the first surface S4 or the second surface S3. The diagonal surface S1 does not intersect the corner between the third surface S5 and the fourth surface S2 because of its angle. Instead, the diagonal surface S1 intersects a middle region of the third surface S5 between the two adjacent corners.

As shown in FIG. 6, the beam splitter has a first surface S4 and a second surface S3. The second surface S3 is connected with and perpendicular to the first surface S4. The first surface S4 is longer than the second surface S3. A third surface S5 is connected with and perpendicular to the first surface S4. The third surface S5 is opposite from the second surface S3. The third surface S5 has a same length as the second surface S3. A fourth surface S2 is connected with and perpendicular to the second surface S3 and the third surface S5. The fourth surface S2 is opposite from the first surface S4. The fourth surface S2 has a same length as the first surface S4.

In FIG. 6, a diagonal surface S1 in the beam splitter extends from a corner between the first surface S4 and the second surface S3 to a point on the fourth surface S2 that is a non-zero distance from a corner between the fourth surface S2 and the second surface S3 and that is a non-zero distance from a corner between the fourth surface S2 and the third surface S5. The diagonal surface S1 extends at a 45° angle relative to the first surface S4 or the second surface S3. The diagonal surface S1 does not intersect the corner between the third surface S5 and the fourth surface S2 because of its angle. Instead, the diagonal surface S1 intersects a middle region of the fourth surface S2 between the two adjacent corners.

The beam splitter has a rectangular cuboid shape (i.e., a three-dimensional rectangle). The beam splitter includes one triangular prism and one polygonal prism that are combined to form the rectangular cuboid. While four surfaces are labeled in FIGS. 5 and 6, there are two additional surfaces because it is a rectangular cuboid. These additional surfaces extend into and out of the page.

The first surface S4 and the fourth surface S2 have a same surface area. The second surface S3 and the third surface S5 have a same surface area. These surfaces with a same surface area have the same dimensions along their perimeter.

Using the design shown in FIGS. 5 and 6, the beam splitter is configured to have no interference fringes by reflections. The OPD between reflection beams in the beam splitter is longer than time coherence length of illumination light. Zero interference fringes may occur if the OPD is larger than the time coherence length of illumination light. For example, the coherence length can be from a few millimeters to a few centimeters. In an instance, the coherence length is less than 5 mm. A longer coherence length (e.g., 10 cm) may require a larger non-polarizing beam-splitter in one direction.

In an instance, the beam splitter has a refractive index from 1.3 to 1.8. For example, the refractive index may be 1.5. The refractive index varies with the wavelength and material of the beam splitter.

With a coherence length <5 mm and non-polarizing beam-splitter material refractive index of 1.5, an extra optical path difference of 5 mm uses a size elongation of non-polarizing beam-splitter in the fourth surface S2 or third surface S5 of approximately 1.7 mm. If the coherence length is 50 mm (i.e., 10 times larger), it may be still feasible to increase non-polarizing beam-splitter size by 17 mm in fourth surface S2 side or third surface S5 side.

If illumination light coherence length is not large, a rectangular cuboid non-polarizing beam-splitter can be designed to not cause interference fringes between the two reflection beams from fourth surface S2 or third surface S5 after a sufficiently long extra optical path difference is introduced between them. The size elongation can be either in fourth surface S2 or third surface S5. The size elongation in the fourth surface S2 has an advantage compared with in the third surface S5 because there is no optical impact to the imaging path from the sample to the image sensor. Because S5 is in the imaging path, size elongation in S5 direct will impact the imaging path.

Figure 7:
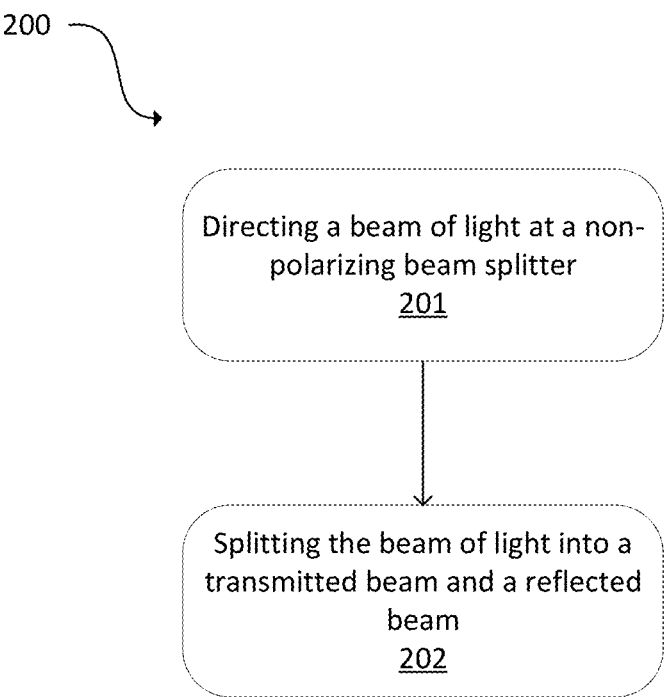
FIG. 7 is a flowchart of a method in accordance with the present disclosure.

FIG. 7 is a flowchart of a method 200. A beam of light is directed at non-polarizing beam splitter at 201. The beam splitter is described in, for example, FIG. 5, FIG. 6, or another embodiment disclosed herein. Thus, the beam splitter can have a rectangular cuboid shape. The beam of light can be directed at, for example, the first surface S4. At 202, the beam of light is split into a transmitted beam and reflected beam. The beam of light can be imaged with an image sensor. The beam splitter can be configured to have no interference fringes by reflections. The optical path difference between reflection beams in the beam splitter may be longer than a time coherence length of illumination light.

Both transmitted and reflected beams cause two surface reflection beams from S2 and S5, respectively. The two surface reflection beams can cause interference fringes on the image sensor. Size elongation in S2 or S5 increases the OPD between two surface reflections and can remove the interference fringes between them.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A beam splitter comprising:
a first surface;
a second surface connected with and perpendicular to the first surface, wherein the first surface has a different length than the second surface;
a third surface connected with and perpendicular to the first surface and opposite from the second surface, wherein the third surface has a same length as the second surface;
a fourth surface connected with and perpendicular to the second surface and the third surface, wherein the fourth surface is opposite of the first surface;
wherein a diagonal surface in the beam splitter extends from a corner between the first surface and the second surface at a 45° angle to a point on the third surface or the fourth surface, wherein the diagonal surface is configured to provide an optical path difference from the diagonal to the fourth surface and from the diagonal to the second surface, wherein the optical path difference is longer than a time coherence length of illumination light, and wherein the beam splitter is non-polarizing.

2. The beam splitter of claim 1, wherein the beam splitter is rectangular cuboid.

3. The beam splitter of claim 1, wherein the first surface and the fourth surface have a same surface area, and wherein the second surface and the third surface have a same surface area.

4. The beam splitter of claim 1, wherein the diagonal surface intersects the third surface at a point between adjacent corners of the third surface.

5. The beam splitter of claim 1, wherein the diagonal surface intersects the fourth surface at a point between adjacent corners of the fourth surface.

6. The beam splitter of claim 1, wherein the beam splitter is configured to have no interference fringes by reflections.

7. A method comprising:
directing a beam of light at a beam splitter, wherein the beam splitter is non-polarizing, and wherein the beam splitter comprises:
a first surface;
a second surface connected with and perpendicular to the first surface, wherein the first surface has a different length than the second surface;
a third surface connected with and perpendicular to the first surface and opposite from the second surface, wherein the third surface has a same length as the second surface; and
a fourth surface connected with and perpendicular to the second surface and the third surface, wherein the fourth surface is opposite of the first surface;
wherein a diagonal surface in the beam splitter extends from a corner between the first surface and the second surface at a 45° angle to a point on the third surface or the fourth surface, wherein the diagonal surface is configured to provide an optical path difference from the diagonal to the fourth surface and from the diagonal to the second surface, and wherein the optical path difference is longer than a time coherence length of the beam of light; and
splitting the beam of light into a transmitted beam and a reflected beam.

8. The method of claim 7, wherein the beam of light is directed at the first surface.

9. The method of claim 7, wherein the beam splitter is a rectangular cuboid.

10. The method of claim 7, wherein the first surface and the fourth surface have a same surface area, and wherein the second surface and the third surface have a same surface area.

11. The method of claim 7, wherein the diagonal surface intersects the third surface at a point between adjacent corners of the third surface.

12. The method of claim 7, wherein the diagonal surface intersects the fourth surface at a point between adjacent corners of the fourth surface.

13. The method of claim 7, wherein the beam splitter is configured to have no interference fringes by reflections.

14. The method of claim 7, further comprising imaging the beam of light with an image sensor.

* * * * *